United States Patent
Nagai

(10) Patent No.: US 11,481,789 B2
(45) Date of Patent: Oct. 25, 2022

(54) INFORMATION PROCESSING APPARATUS, SYSTEM, CONTROL METHOD FOR INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Kentaro Nagai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/210,728

(22) Filed: Dec. 5, 2018

(65) Prior Publication Data
US 2019/0188734 A1 Jun. 20, 2019

(30) Foreign Application Priority Data
Dec. 19, 2017 (JP) .............................. JP2017-242877

(51) Int. Cl.
*G06Q 30/02* (2012.01)
*G06V 20/52* (2022.01)

(52) U.S. Cl.
CPC ......... *G06Q 30/0201* (2013.01); *G06V 20/53* (2022.01)

(58) Field of Classification Search
None
See application file for complete search history.

(56) References Cited

U.S. PATENT DOCUMENTS 8,412,656 B1 * 4/2013 Baboo ................ G06Q 30/0201
706/20
10,217,120 B1 * 2/2019 Shin ................ G06Q 10/06393
(Continued)

FOREIGN PATENT DOCUMENTS

JP 2006185293 A 7/2006
JP 2006350701 A 12/2006
(Continued)

OTHER PUBLICATIONS

Shivashankar et al., IN 201741035297. Certified copy of the priority document for PCT/IN2018/050631. Retrieved from [URL: https://register.epo.org/documentView?number=IN.2018050631.W&documentId=id00000047833119]. (Year: 2017).*
(Continued)

Primary Examiner — Susanna M. Diaz
(74) Attorney, Agent, or Firm — Carter, DeLuca & Farrell LLP

(57) ABSTRACT

An information processing apparatus comprising a traffic line information generation unit configured to generate, based on information provided from an image capturing apparatus arranged in a store, traffic line information in the store of a customer who visits the store, an acquisition unit configured to acquire purchased product information associated with a product purchased by the customer in the store, a purchase information generation unit configured to generate purchase information based on the purchased product information by associating the traffic line information and the purchased product with the customer, and a display information generation unit configured to generate, based on the purchase information, display information for displaying information about one of a customer and a product in association with a time taken to select the purchased product and a selection order of the purchased product.

15 Claims, 9 Drawing Sheets

(56) References Cited

U.S. PATENT DOCUMENTS

| | | | | |
|---|---|---|---|---|
| 10,713,670 | B1* | 7/2020 | Moon | G06Q 30/0201 |
| 2008/0159634 | A1* | 7/2008 | Sharma | G06K 9/00771 |
| | | | | 382/224 |
| 2010/0004997 | A1* | 1/2010 | Mehta | H04L 67/306 |
| | | | | 705/14.66 |
| 2010/0185487 | A1* | 7/2010 | Borger | G06Q 30/0201 |
| | | | | 705/7.29 |
| 2013/0335572 | A1* | 12/2013 | Fuhr | H04N 7/18 |
| | | | | 348/150 |
| 2014/0195302 | A1* | 7/2014 | Yopp | G06Q 30/00 |
| | | | | 705/7.33 |
| 2014/0249887 | A1* | 9/2014 | Parkkinen | G06Q 30/0202 |
| | | | | 705/7.31 |
| 2015/0025936 | A1* | 1/2015 | Garel | G06Q 30/0269 |
| | | | | 705/7.29 |
| 2017/0213224 | A1* | 7/2017 | DeLuca | G06Q 30/0625 |
| 2017/0315208 | A1* | 11/2017 | Sadr | G01S 5/0036 |
| 2019/0108561 | A1* | 4/2019 | Shivashankar | G06K 9/00624 |

FOREIGN PATENT DOCUMENTS

| | | | |
|---|---|---|---|
| JP | 2010002997 A | 1/2010 | |
| JP | 2010113692 A | 5/2010 | |
| WO | WO-2014102797 A1 * | 7/2014 | G07C 11/00 |

OTHER PUBLICATIONS

Notice of Reasons for Refusal issued by the Japan Patent Office dated Sep. 27, 2021 in corresponding JP Patent Application No. 2017-242877, with English translation.

* cited by examiner

FIG. 4

| VISIT DAY: 2017,XX,XX | | ENTRY TIME: XX:XX | LEAVING TIME:XX:XX |
|---|---|---|---|
| CUSTOMER ID: XXXX | | SEX: MALE | AGE: 32 |
| ORDER | SHELF | STAY (SELECTION) TIME | PURCHASED PRODUCT |
| 1 | E-1 | 10 SECONDS | PRODUCT A |
| 2 | A-1 | 5 SECONDS | PRODUCT B |
| 3 | E-5 | 50 SECONDS | |
| 4 | D-2 | 120 SECONDS | PRODUCT C |
| 5 | E-7 | 60 SECONDS | PRODUCT D |
| 6 | REGISTER | 120 SECONDS | |
| 7 | E-9 | 20 SECONDS | |

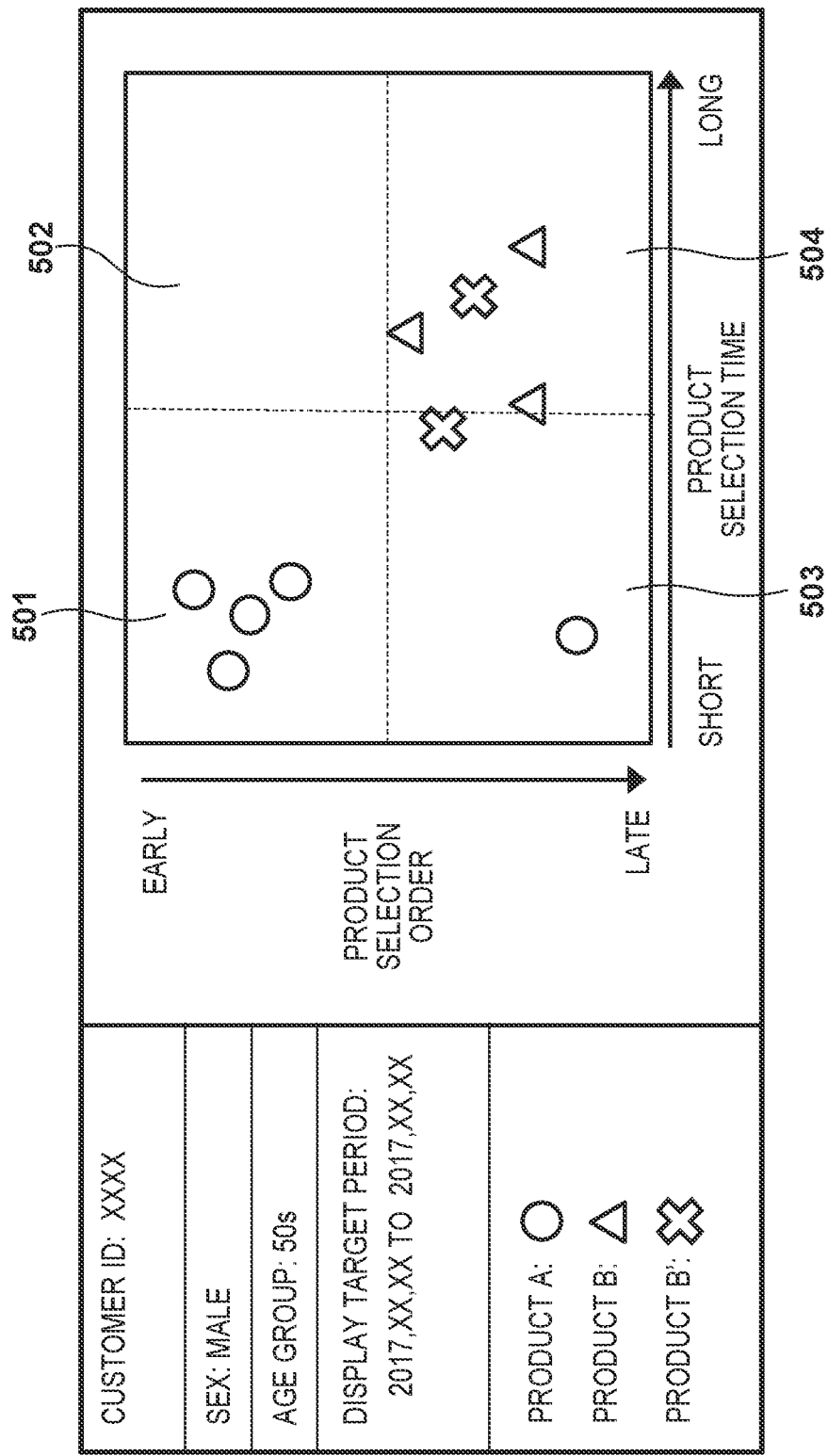

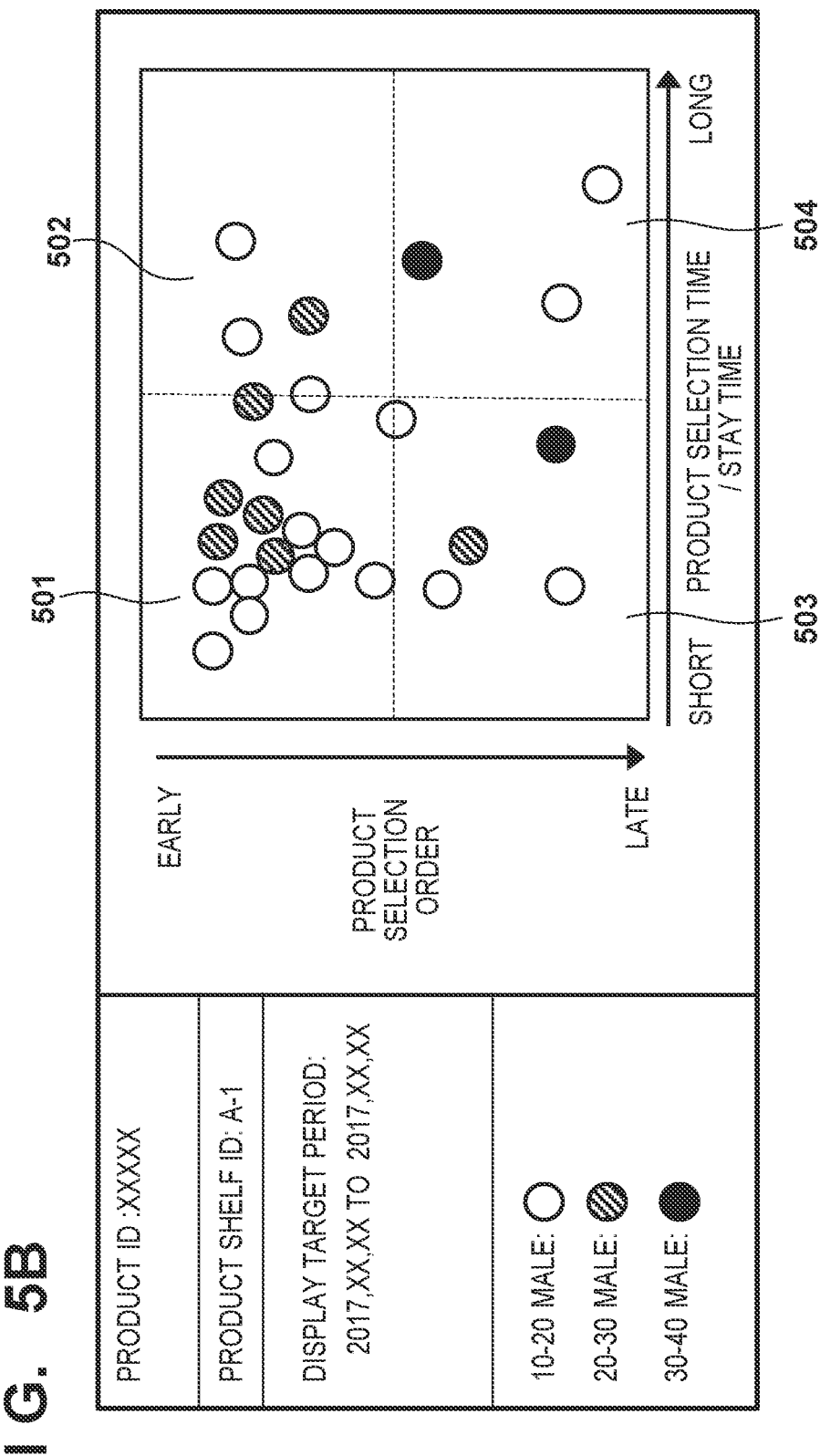

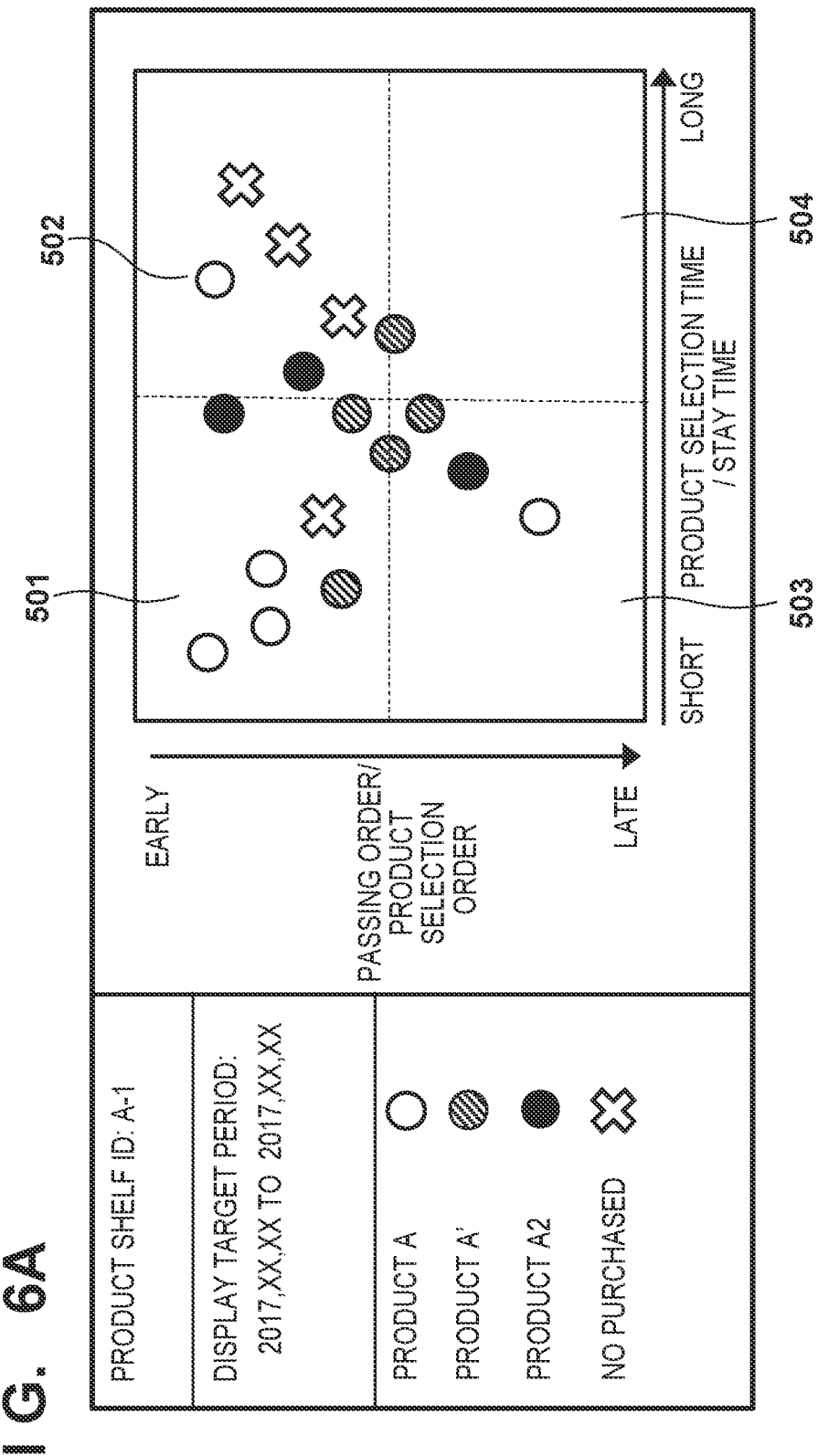

FIG. 6B

CHARACTERISTIC OF EACH SHELF

| | QUICK SELECTION | SLOW SELECTION |
|---|---|---|
| EARLY ORDER | I | II |
| LATE ORDER | III | IV |

INFORMATION PROCESSING APPARATUS, SYSTEM, CONTROL METHOD FOR INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a system, a control method for the information processing apparatus, and a non-transitory computer-readable storage medium.

Description of the Related Art

In recent years, a network camera has been widely applied to applications other than security use utilizing analysis of images obtained from the network camera in addition to monitoring/crime prevention use in a store. For example, a system in which a network camera is installed in front of a register in a retail shop, the features (face, age, sex, and the like) of a customer are extracted from a video obtained from the network camera, and the features of the customer and purchase information at the register are associated with each other and utilized for marketing analysis has appeared on the market. In another application, an example is disclosed in which a specific person is tracked from an image of a camera and the movement of the person in a store is tracked and recorded as a traffic line, thereby using the information to improve the layout in the store.

By applying these techniques, Japanese Patent Laid-Open No. 2006-350701 discloses a customer behavior recording apparatus and a method for collecting, from the behavior of a customer in a store, data useful for marketing. This technique discloses a system of linking a camera in a facility for capturing a person moving in the facility with a purchase record at a register. It is possible to link the behavior of a customer in a store with purchase information, and this information can be used to change the layout in the store and used for marketing.

Japanese Patent Laid-Open No. 2010-113692 has a feature in which a person feature acquisition camera is installed at a register separately from a monitoring camera and the register. This makes it possible to analyze the individual features of a customer, for example, detailed customer data including an age and a sex, thereby allowing more detailed marketing.

As described above, a network camera exceeds the range of conventional monitoring/crime prevention applications, and the way of extracting useful information is becoming important for the network camera.

SUMMARY OF THE INVENTION

It is useful to extract, as the above-described extracted information, information indicating an order in which a customer selects products and the time taken to select each product since it is possible to estimate the visit purpose of the customer and the purchase reason of each product. The present invention provides a technique capable of providing information indicating the customer's selection order of a product, the time taken to select the product, and the like.

One aspect of embodiments of the invention relates to an information processing apparatus comprising, a traffic line information generation unit configured to generate, based on information provided from an image capturing apparatus arranged in a store, traffic line information in the store of a customer who visits the store, an acquisition unit configured to acquire purchased product information associated with a product purchased by the customer in the store, a purchase information generation unit configured to generate purchase information based on the purchased product information by associating the traffic line information and the purchased product with the customer, and a display information generation unit configured to generate, based on the purchase information, display information for displaying information about one of a customer and a product in association with a time taken to select the purchased product and a selection order of the purchased product, wherein the traffic line information includes information of a stay time of the customer at each of a plurality of product installation places in the store and an order at which the customer passes by the product installation places in the store, and in accordance with association between the purchased product in the purchase information and the product installation place in which the product is installed, the display information generation unit decides the time taken to select the purchased product based on the stay time of the customer at each of the plurality of product installation places, and decides the selection order of the purchased product based on the order at which the customer passes by the product installation place.

Further features of the present invention will become apparent from the following description of exemplary embodiments (with reference to the attached drawings).

BRIEF DESCRIPTION OF THE DRAWINGS

FIG. 4 is a table showing an example of the data structure of purchase information according to the embodiment of the present invention;

FIG. 5A is a view showing an example of a screen for providing information in association with a specific customer, which is displayed on an information display device 500 according to the embodiment of the present invention;

FIG. 5B is a view showing an example of a screen for providing information in association with a specific product, which is displayed on the information display device 500 according to the embodiment of the present invention;

FIG. 6A is a view showing an example of a screen for providing information in association with a specific store shelf, which is displayed on the information display device 500 according to the embodiment of the present invention; and FIG. 6B is a view showing an example of a screen for providing category information of store shelves, displayed on the information display device 500 according to the embodiment of the present invention.

DESCRIPTION OF THE EMBODIMENTS

Figure 1:
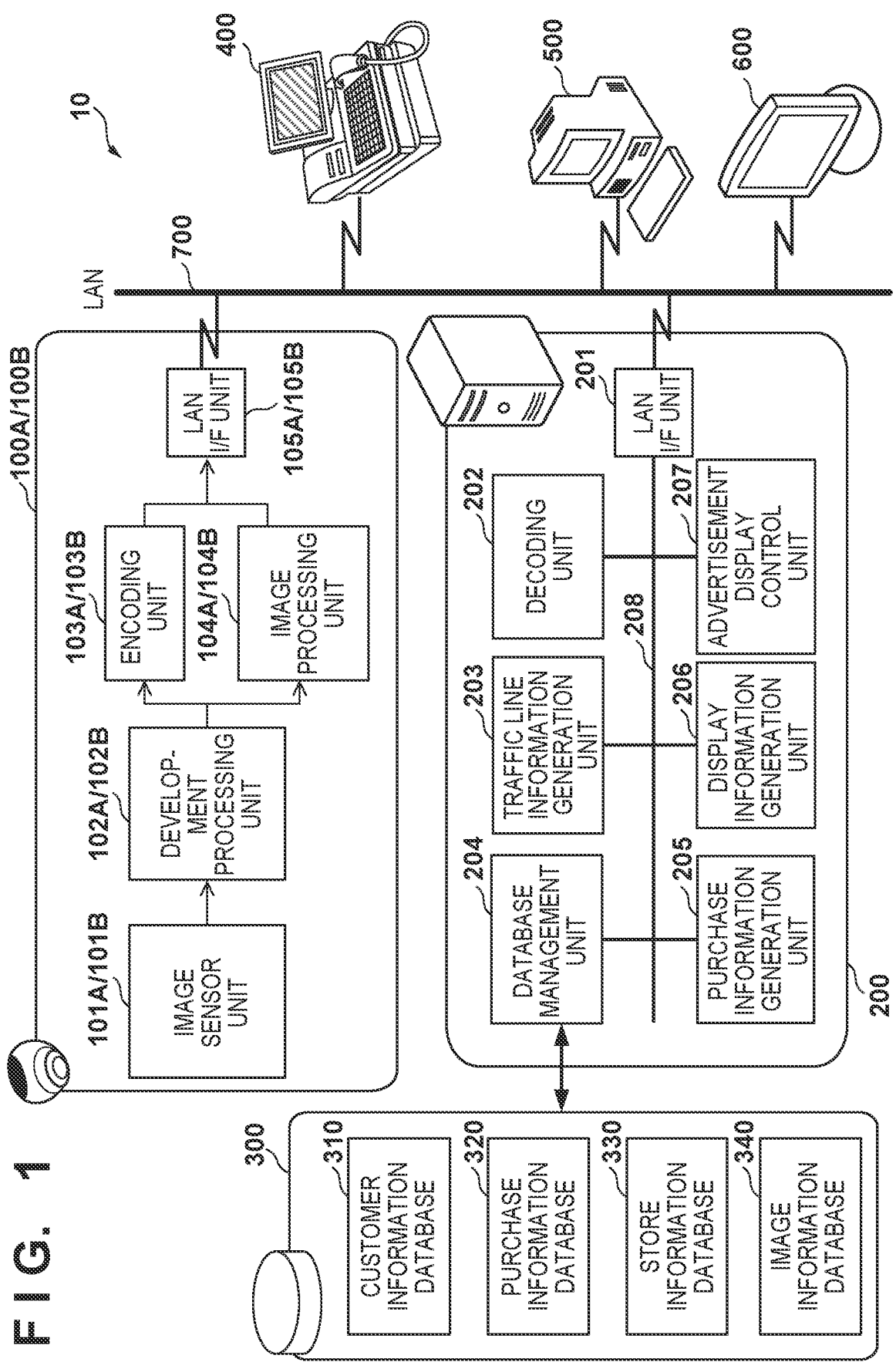
FIG. 1 is a block diagram showing an example of the arrangement of a system according to an embodiment of the present invention.

FIG. 1 is a block diagram showing an example of the arrangement of a system 10 according to an embodiment of the present invention. The system 10 is formed by a network camera 100A/100B, an information processing apparatus 200, a database apparatus 300, a POS (Point Of Sales) register terminal 400, an information display device 500, and an advertisement display device 600, all of which are interconnected by a LAN 700 as a network line. The constituent elements of the system 10 shown in FIG. 1 are merely examples, and other constituent elements may be added. Each constituent element will be described below.

Each network camera 100 can be configured to include an image sensor unit 101, a development processing unit 102, an encoding unit 103, an image processing unit 104, and a LAN interface (I/F) unit 105. In this embodiment, two kinds of network cameras can be used. The first network camera 100A is a traffic line tracking camera that tracks the traffic line of a customer moving in a store, and generates tracking information representing a behavior such as a movement or action of the customer in the store. The second network camera 100B is a person specifying camera that captures an image for extracting information about a person who visits the store. The embodiment using the two kinds of network cameras will be described below. However, the two kinds of network cameras need not always be used, and person information may be extracted from an image captured by the first network camera.

Each constituent element of the first network camera 100A is denoted by a reference numeral added with "A", and each constituent element of the second network camera 100B is denoted by a reference numeral added with "B".

The image sensor unit 101A/101B includes an imaging element such as a CMOS element that photoelectrically converts an optical image formed on an imaging plane and outputs an analog image signal, and an A/D converter that converts an analog image signal into a digital image signal. The development processing unit 102A/102B executes predetermined development processing for the digital image signal output from the image sensor unit 101A/101B. The development processing can include, for example, DeBayer processing, white balance processing, tone conversion processing, edge enhancement correction processing, flaw correction, noise removal, enlargement/reduction processing, and color conversion to the YCbCr format.

The encoding unit 103A/103B compresses/encodes the digital image signal output from the development processing unit 102A/102B to generate image data for distribution to be provided to the information processing apparatus 200. The generated image data includes the identification information (camera ID) of the network camera 100A/100B, information (position information) of an installation place, and shooting time information. The encoding unit 103A/103B also sets a frame rate at the time of generation of image data. An image compression method for distribution can comply with a standard such as H.264, H.265, MJPEG, or JPEG. Image data in an arbitrary format including the MP4 or AVI format may be generated.

The image processing unit 104A/104B performs image processing corresponding to the digital image output from the development processing unit 102A/102B. The image processing unit 104A in the first network camera 100A performs image recognition processing to generate tracking information. In the image recognition processing, it is possible to recognize and track the movement and action of a customer as an object from the digital image using a technique known as pattern recognition/media understanding. More specifically, various known image recognition processing methods using background subtraction, template matching, a correlation method, and a feature tracking method can be used. The image processing unit 104A includes, in the tracking information, information indicating the position and size of the detected person in the digital image.

Note that tracking information may be created by not only recognizing a customer as a person in the image but also recognizing a shopping cart or basket as an accessory of the customer in the image. This is because it is easy to recognize, in an image, a shopping cart or basket whose shape is defined, as compared to various person images. By providing a tag such as a one- or two-dimensional barcode or the like on the shopping cart or basket, the processing in the image processing unit 104A can be performed easily and surely, thereby preventing confusion among a plurality of tracking targets. If the tracking information includes image data of the detected customer, the image data undergoes the same compression/encoding processing as that executed by the encoding unit 103, and includes JPEG image data in the case of, for example, a still image.

The tracking information is generated to include the camera ID of the first network camera 100A that has shot the person, and shooting time information together with the information of the position and size of the detected customer in the digital image, and transmitted from the first network camera 100A to the information processing apparatus 200.

The image processing unit 104B in the second network camera 100B analyzes the digital image to generate information indicating the person features of the customer as an object. The person features can include, for example, attributes for classifying the customer into a predetermined category, and detailed examples thereof are a sex and an age group. The image processing unit 104B can determine a sex and an age group based on the appearance features of the object.

An individual customer may be specified in more detail. In this case, for example, a face image of each customer or the like can be registered in advance in a customer information database 310 for an image search. The network camera 100B may search for an image matching a face image extracted from the digital image among the face images registered in the customer information database 310 via the information processing apparatus 200, and specify the corresponding customer. If the customer can be specified in the customer information database 310, information indicating the person features of the customer can be set as identification information of the customer.

The person feature information acquired as an analysis result of the digital image is transmitted to the information processing apparatus 200 together with the image data as the analysis target. At this time, the image data undergoes the same compression/encoding processing as that executed by the encoding unit 103, and includes JPEG image data in the case of, for example, a still image. The detected person information and its coordinate information in the captured image are provided to the information processing apparatus 200 together with the camera ID of the network camera 100B that has shot the person, position information, shooting time information, and the like. This information that is generated by the network camera 100B and provided to the information processing apparatus will be referred to as "person feature information" hereinafter.

The image processing unit 104A/104B may be included in an external apparatus, for example, the information processing apparatus 200, instead of being included in the network camera 100A/100B. In this case, the information processing apparatus 200 may execute some or all of the functions executed by the image processing unit 104A/104B, and the network camera 100A/100B may execute the remaining functions.

The LAN I/F unit 105A/105B serves as a communication interface for transmitting, to the information processing apparatus 200 via the LAN 700, the image data output from the encoding unit 103A/103B or the tracking information or the person feature information generated by the image processing unit 104A/104B. The LAN I/F unit 105A/105B adjusts data exchange with a communication partner using, for example, a network file system such as NFS or CIFS or a network communication protocol such as UDP or TCP.

Next, the arrangement of the information processing apparatus 200 will be described. The information processing apparatus 200 can be configured to include a LAN interface (I/F) unit 201, a decoding unit 202, a traffic line information generation unit 203, a database management unit 204, a purchase information generation unit 205, a display information generation unit 206, and an advertisement display control unit 207, all of which are connected to each other by a system bus 208.

The LAN I/F unit 201 communicates with the network camera 100A/100B, the information display device 500, and the like via the LAN 700. The decoding unit 202 reconstructs a digital image signal by decompressing and decoding the image data acquired from the network camera 100 via the LAN 700 or the image data included in the tracking information or person feature information. The decoded digital image signal is saved in the image information database 340 via the database management unit 204. In an embodiment in which the information processing apparatus 200 includes the image processing unit 104A/104B, the image processing unit 104A/104B can be provided so as to be connected to the system bus 208. The image processing unit 104A/104B extracts person feature information from the image data decoded by the decoding unit 202, and generates person tracking information.

Based on pieces of tracking information received from the plurality of first network cameras 100A and information about the physical installation positions, heights, and directions of the cameras 100A, the traffic line information generation unit 203 generates traffic line information representing a traffic line in the store from when the customer enters the store until he/she leaves there. The information about the physical installation positions, heights, and directions of the network cameras 100A are included in store information (to be described later). The generated traffic line information is provided to the purchase information generation unit 205. The database management unit 204 manages registration information in each of the database 310, databases 320 and 330, and the database 340 of the database apparatus 300. For example, the database management unit 204 performs processing of updating the registration information in each database, extracting the registration information from each database, and providing the information to each processing unit, as needed.

Based on the traffic line information generated by the traffic line information generation unit 203, the person feature information received from the second network camera 100B, and purchased product information received from the POS register terminal 400, the purchase information generation unit 205 generates purchase information for each customer who visits the store. The generated purchase information is accumulated in the purchase information database 320, and is referred to when the display information generation unit 206 generates display information to be provided to the information display device 500.

Based on the purchase information generated by the purchase information generation unit 205 and stored in the purchase information database 320, the display information generation unit 206 generates display information to be provided to the information display device 500. An example of display on the information display device 500 using the display information will be described later with reference to FIGS. 5A, 5B, and 6A. The advertisement display control unit 207 controls advertisement display on the advertisement display device 600 arranged at a predetermined position in the store.

The database apparatus 300 is a database in which information to be referred to by the information processing apparatus 200 to execute processing according to this embodiment is registered, and can include the customer information database 310, the purchase information database 320, the store information database 330, and the image information database 340. Although the database apparatus 300 is connected to the information processing apparatus 200, the database apparatus 300 may include a network interface to be connected to the LAN 700. In this case, the information processing apparatus 200 and the database apparatus 300 communicate with each other via the LAN I/F unit 201.

The customer information database 310 is a database in which information of a customer who has performed member registration in the store applied with the system 10 is registered. The customer information database 310 includes, for example, arbitrary personal information of an address, phone number, email address, occupation, and the like in addition to customer identification information (ID) for identifying a customer, a member number (which may be the same as a customer ID), a name, and the sex and age of the customer. If the customer is made recognizable by image recognition, face image data of the customer may be registered. The customer ID is information recorded in a member card, and can be read from the member card by the POS register terminal 400. The read member information is provided to the information processing apparatus 200, and used to specify member information in the customer information database 310.

The purchase information database 320 is a database in which, for each customer, purchase information obtained by associating a purchase result of one visit with traffic line information from when the customer enters the store until he/she leaves there is registered. The registered contents in the database will be described later with reference to FIG. 4. In the store information database 330, store information about the store applied with the system 10 is registered. The store information includes information about the layout in the store, for example, information of regions to be shot by the network cameras 100A in the store, information about the arrangement of store shelves, information about products displayed on each store shelf, and information of the arrangement positions of the network cameras 100A. More specifically, the information of the arrangement positions of the network cameras 100A is information about the physical installation positions, heights, and directions of the network cameras 100A. The store information particularly includes information for converting the position, in an image captured by each network camera 100A, of a person detected from the image into a physical position in the layout in the store. In the image information database 340, an image captured by the network camera 100A or 100B is saved.

The POS register terminal 400 is an information processing apparatus for paying for a product to be purchased in the store, and can uniquely specify a product purchased by a customer by reading barcode information of the product. The purchased product information is transmitted to the information processing apparatus 200 together with information of time at which the product is paid for. If the customer is a member of the store, the POS register terminal 400 reads the customer ID from a presented member card, and transmits it to the information processing apparatus 200. This enables the information processing apparatus 200 to specify the customer information in the customer information database 310. Note that the member card is merely an example, and may be another kind of card as long as identification information capable of uniquely specifying an individual can be acquired from the card. In this case, the identification information is registered as a customer ID in the customer information database 310.

The information display device 500 is a device that displays the information transmitted from the information processing apparatus 200, and can be implemented by, for example, a personal computer (PC), a tablet terminal, or a smartphone terminal. The information display device 500 may be connected to the LAN 700 via a wire or wirelessly. Wireless connection can comply with, for example, the standard of IEEE802.11 wireless LAN. The information display device 500 can accept an input operation for designating items to be displayed, and transmits item information based on the accepted input operation to the information processing apparatus 200. The information processing apparatus 200 generates display information based on the item information, and provides it to the information display device 500.

The advertisement display device 600 is a display terminal for displaying an advertisement concerning a predetermined product or the like in the store under the control of the advertisement display control unit 207 of the information processing apparatus 200, and can be implemented by, for example, a personal computer (PC) or a tablet terminal.

In the arrangement of the system 10 shown in FIG. 1, the number of network cameras 100A/100B can be an arbitrary number that is one or more, and is not limited. Each of the information processing apparatus 200, the database apparatus 300, and the information display device 500 is implemented by a single apparatus but each function may be implemented by a plurality of apparatuses in cooperation with each other.

Figure 2A:
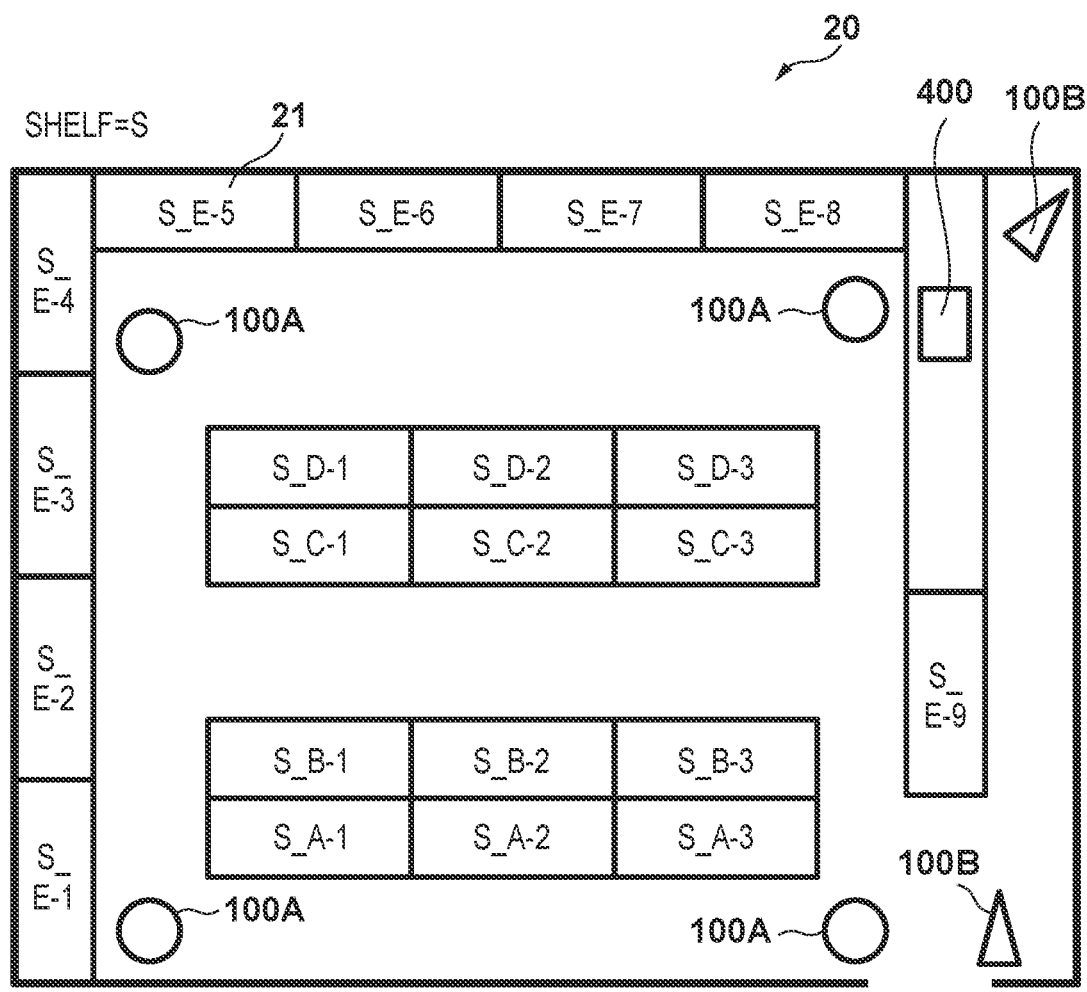
FIG. 2A is a view showing an example of a store to which the embodiment of the present invention is applicable.

The system 10 according to this embodiment can be applied to, for example, a predetermined store 20, as shown in FIG. 2A. A plurality of store shelves 21 are arranged as product installation places in the store 20, and products are installed on each shelf. The kinds of products are not particularly limited. The products are not limited to products to be sold, and may be, for example, rental products. Information indicating a specific product arranged on a specific shelf is stored in advance in a table format in the store information database 330. Since a space is provided between the shelves in the store 20, customers can come and go through the space.

The behavior of a customer can be tracked by one or more traffic line tracking cameras 100A. The traffic line tracking camera 100A is installed so as to be able to shoot a state of each customer in a partial range or an entire range in the store 20. If a plurality of traffic line tracking cameras 100A are installed, it is only necessary to capture an image of the entire region in the store 20 with the plurality of traffic line tracking cameras 100A.

The POS register terminal 400 is installed at a register counter. If the customer purchases a product, he/she pays at the register counter. A state at this time is shot by the person specifying camera 100B, and person specifying processing is performed. This can associate the customer who has purchased the product with the purchased product. The person specifying camera 100B may be installed at the entrance of the store 20, and can shoot a person who enters the store, and perform person specifying processing of specifying the sex, the age group, and the like of the customer. As described above, the camera 100B aims to acquire the person features of a customer, and is thus desirably installed in a location where a customer passes through without exception and an image with quality high enough to acquire person features can be captured.

FIG. 2A shows, as the store 20 that sells products, the facility applied with the system 10. The product installation place need not be a store shelf. Instead, for example, the product installation place may be a display window for displaying a product, or a display space for an advertisement, digital signage, or the like. The product installation place may be used for sales promotion to customers who have entered the store. The number of POS register terminals 400 is not limited to one, and a plurality of POS register terminals 400 may be included.

Figure 2B:
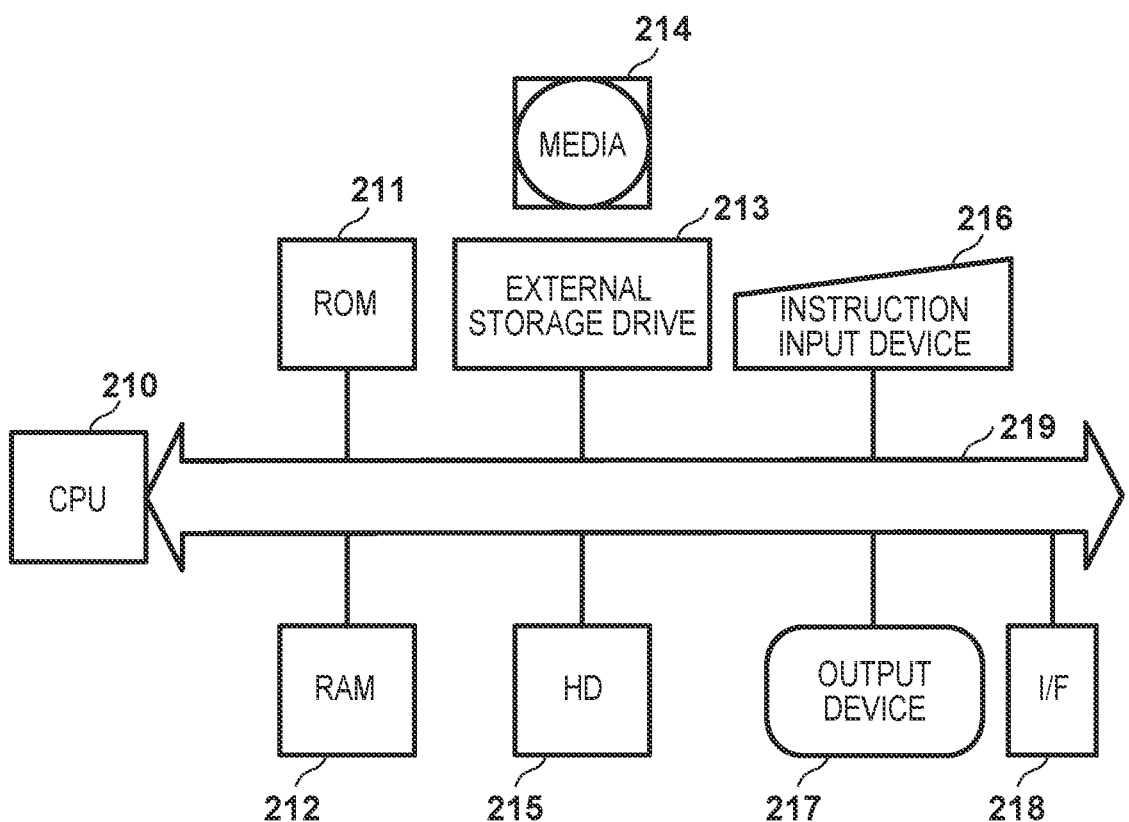
FIG. 2B is a block diagram showing an example of the hardware arrangement of an information processing apparatus 200 according to the embodiment of the present invention.

The schematic arrangement of the information processing apparatus 200 forming the system 10 according to this embodiment will be described next. FIG. 2B is a block diagram showing an example of the hardware arrangement of the information processing apparatus 200. The above-described database apparatus 300, POS register terminal 400, information display device 500, and advertisement display device 600 as information processing apparatuses may have similar or same hardware arrangements.

Referring to FIG. 2B, a CPU 210 performs control to execute an application program, an operating system (OS), a control program, or the like stored in a hard disk device (to be referred to as an HD hereinafter) 215 and temporarily store, in a RAM 212, information, files, and the like necessary to execute a program. The CPU 210 also executes processing according to this embodiment based on the detected person information provided from the network camera 100 and stored in the RAM 212 and the information acquired from the database apparatus 300. Furthermore, the CPU 210 controls data transmission/reception to/from the external information display device 500 via an interface (I/F) 218. Note that processes of FIG. 3 (to be described later) are implemented when the CPU 210 controls the overall apparatus by executing corresponding processing programs.

A ROM 211 internally stores various data such as an application program for executing predetermined processing in addition to a basic I/O program. The RAM 212 temporarily stores various data, and functions as a main memory, a work area, or the like for the CPU 210. The RAM 212 also temporarily stores the information received from the network camera 100A/100B or the database apparatus 300.

An external storage drive 213 is an external storage drive for implementing access to a recording medium, and can load a program and the like stored in a medium (recording medium) 214 into this computer system. Note that as the medium 214, for example, a Floppy® disk (FD), CD-ROM, CD-R, CD-RW, PC card, DVD, Blu-ray®, IC memory card, MO, memory stick, or the like can be used.

In this embodiment, as the external storage device 215, an HD (Hard Disk) functioning as a mass memory is used. The HD 215 stores application programs, an OS, control programs, and related programs, and the like. Note that instead of the hard disk, nonvolatile storage device such as a Flash® memory may be used.

A keyboard and a pointing device (mouse or the like), a touch panel, or the like corresponds to an instruction input device 216. Note that if the instruction input device 216 is formed as the POS register terminal 400, the instruction input device 216 can include a barcode reader. An output device 217 outputs a command input from the instruction input device 216, a response output of the information processing apparatus 200 to the command, or the like. The output device 217 can include a display, a loudspeaker, and a headphone terminal. A system bus 219 manages the flow of data in the information processing apparatus 200.

The interface (to be referred to as the I/F hereinafter) 218 has a role in mediating data exchange with an external apparatus. More specifically, the I/F 218 can include a wireless communication module, and the module can include well-known circuit mechanisms including an antenna system, an RF transmitter/receiver, one or more amplifiers, a tuner, one or more oscillators, a digital signal processor, a CODEC chipset, a subscriber identification module card, and a memory. Furthermore, the I/F 218 can include a wired communication module for wired connection. The wired communication module allows communication with another device via one or more external ports. The I/F 218 can include various software components that process data. The external port is coupled to another device directly via Ethernet, USB, IEEE 1394, or the like or indirectly via a network. Note that software for implementing the same function as that of each of the above apparatuses can be used in place of the hardware apparatus.

Every time the corresponding program is operated to execute the processing according to this embodiment, the program may be loaded from the HD 215, in which the program has already been installed, into the RAM 212. Alternatively, the program according to this embodiment can be recorded in the ROM 211 to form part of a memory map, and then executed by the CPU 210 directly. Furthermore, the corresponding program and related data can be loaded from the medium 214 into the RAM 212 directly and executed.

Figure 3:
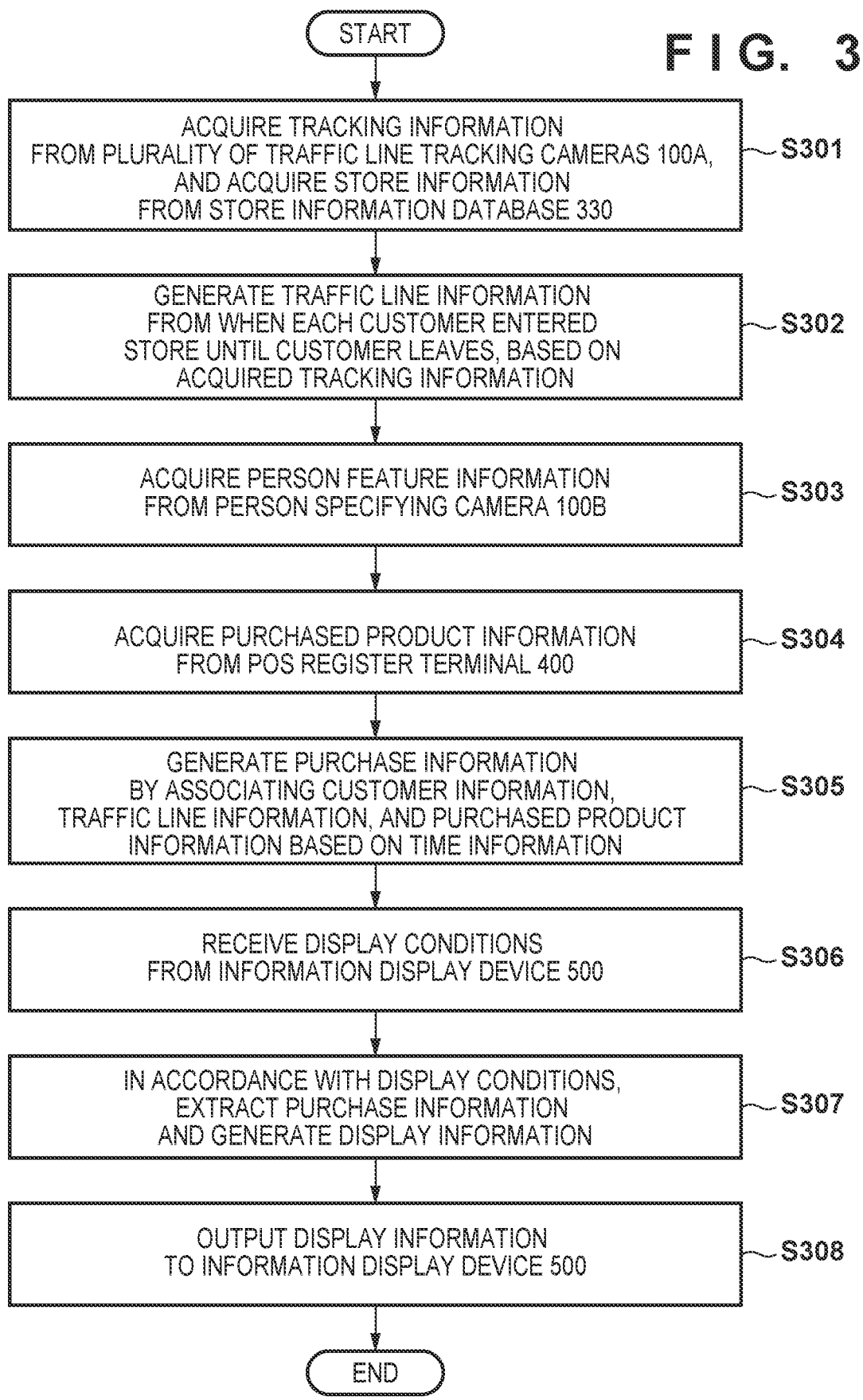
FIG. 3 is a flowchart illustrating an example of processing executed by the information processing apparatus 200 in a system 10 according to the embodiment of the present invention.

Processing of generating purchase information based on pieces of information obtained from the network cameras 100A and 100B and the POS register terminal 400 and generating display information for the information display device 500 based on the generated purchase information using the system 10 will be described in detail next with reference to a flowchart shown in FIG. 3. The processing corresponding to the flowchart can be implemented when, for example, one or more processors functioning as the purchase information generation unit 205 or the display information generation unit 206 execute the corresponding program (stored in the ROM or the like).

In step S301, the information processing apparatus 200 acquires pieces of tracking information from the plurality of traffic line tracking cameras 100A. The information processing apparatus 200 also acquires store information from the store information database 330. In this embodiment, since the plurality of traffic line tracking cameras 100A cover the entire store 20, one traffic line tracking camera 100A has a limited shooting range, and cannot track the entire movement of each customer in the store 20. In step S302, the traffic line information generation unit 203 combines the pieces of tracking information acquired from the respective traffic line tracking cameras 100A, and generates, for each customer, traffic line information from when the customer enters the store until he/she leaves there with reference to the store information. A known technique can be used as a method of acquiring traffic line information of each customer in a facility using a plurality of cameras, and a detailed description thereof will be omitted. At this time, information of time at which the customer stays at the register is also generated. The traffic line information generation unit 203 provides the generated traffic line information to the purchase information generation unit 205.

In step S303, the purchase information generation unit 205 acquires person feature information from the person specifying camera 100B. If the person feature information includes image data of a face and the like, the purchase information generation unit 205 may determine again person information such as the sex, age group, and the like of the person based on the image, and modify the feature information of the person included in the person feature information.

In step S304, the purchase information generation unit 205 acquires purchased product information from the POS register terminal 400. The purchased product information includes a product name purchased by the customer, and time (corresponding to product purchase time) at which the customer performs payment at the register. If the customer has a member card of the store, the purchased product information can include information (for example, a customer ID) for specifying the customer, which is acquired from the member card.

In step S305, the purchase information generation unit 205 associates, for each visiting customer, the traffic line information in step S302, the person feature information in step S303, and the purchased product information in step S304 with each other, thereby generating purchase information for each customer. More specifically, since a time period in which each customer pays for at the register can be specified based on the traffic line information, it is possible to associate the traffic line information of a customer, whose product purchase time is in the time period, with the purchased product information included in the time period. The person feature information can also be associated with the purchased product information and the traffic line information based on the time at which the captured image used to generate the person feature information is captured by the person specifying camera 100B. However, if the purchased product information includes member information, customer information more detailed than the person feature information can be used, and thus it is not necessary to associate the person feature information with other information. The generated purchase information is stored in the purchase information database 320.

The purchase information is generated based on the processes in steps S301 to S305 for all visiting customers, and accumulated in the purchase information database 320. The data structure of the purchase information will be described later with reference to FIG. 4.

In step S306, the display information generation unit 206 receives, from the information display device 500, display conditions when displaying a screen on the information display device 500. As for designation or switching of the display conditions, an operation input can be accepted from the user who operates the information display device 500. The display conditions based on the accepted operation contents are transmitted from the information display device 500 to the information processing apparatus 200. The display conditions include pieces of information of a product, a display target period, the attributes of each customer, and the like. These pieces of information can be arbitrarily combined, and set as the display conditions. Details will be described with reference to FIGS. 5A, 5B, and 6A.

In step S307, in accordance with the display conditions received in step S306, the display information generation unit 206 extracts purchase information from the purchase information database 320, and generates display information corresponding to the display conditions. In step S308, the display information generated by the display information generation unit 206 in step S307 is transmitted to the information display device 500 via the LAN I/F unit 201.

An example of the data structure of the purchase information for each customer will be described next with reference to FIG. 4. As shown in FIG. 4, the purchase information includes information such as information of a visit day, entry time, leaving time, a sex, an age (age group), and a customer ID. In addition, the purchase information may include attribute information such as the name, address, email address, occupation, and taste/preference of the customer. Based on the path along which the customer moves in the store and the time during which the customer stops in front of the store shelf 21 in the traffic line information, the purchase information includes information indicating an order at which the customer stops at (passes by or visits) the store shelf 21, the time during which the customer stays there, and a product displayed on the store shelf 21 which has been purchased.

As described above, based on the purchase information, the time during which the customer stays at the specific store shelf 21 is determined. Since this stay time can be expected to be correlated with the time taken to select the product, it is set as an index for a product selection time. It is possible to record the purchase order of the product and the selection time of the product simultaneously by connecting the product finally checked out at the register and purchased to the store shelf 21 on which the product is displayed.

The case in which the information processing apparatus 200 generates traffic line information in the entire store 20 for each customer based on traffic line information generated by each traffic line tracking camera 100A has been described above. In another embodiment of the present invention, without generating traffic line information on the side of the camera, the information processing apparatus 200 may generate traffic line information for each camera based on a shot image obtained from each traffic line tracking camera 100A, and integrate the pieces of information to generate entry/leaving traffic line information.

The example shown in FIG. 4 is an example in a store where products can be purchased. However, in an exhibition site where no products are sold or an exhibition booth in the exhibition site, no purchased product information is registered. In this case, however, an order at which a person stops at a specific place in the booth and the stay time can be recorded simultaneously.

FIG. 5A shows an example of a screen on which, as for a specific customer, with respect to products actually purchased by the customer, the times taken to purchase the products are displayed in association with the selection orders of the products. Display information for performing such display is generated when a specific customer ID is selected as a display condition on the information display device 500.

If a specific customer ID and a display target period are designated as display conditions, among pieces of purchase information assigned with the customer ID, purchase information belonging to the display target period is acquired from the purchase information database 320. Then, a product whose purchase time by the customer belongs to the display target period is specified, and the purchase order of the product and the selection time are individually specified, thereby generating display information.

In the display form shown in FIG. 5A, it is possible to observe the purchase tendency of the specific customer. Information for specifying the customer is displayed in the left portion of the screen, and includes, for example, the customer ID, the sex, the age (age group), the display target period, and actually purchased product information. In addition, the name of the customer and the like may be displayed.

In the right portion of the screen, a scatter diagram (plot) showing the purchase orders and selection times for each product. The ordinate in the scatter diagram corresponds to the time series (early or later in stay time in the store) from when the customer enters the store until he/she performs payment at the register and leaves the store, and indicates the selection order (early or later in product selection order or product purchase order) of the product on the store shelf 21. The time from the entry to leaving variously changes in accordance with the customer and the situation. This graph displays the information by performing normalization based on each stay time from entry to leaving. The abscissa represents the time (long or short in product selection time) elapsed for selection (purchase) of the product. The consequently purchased product is plotted as a point.

In the embodiment of the present invention, the acquired purchase information is accumulated for each customer, and the tendency of purchase intention for each customer can be observed. Referring to FIG. 5A, purchase results are overlapped and plotted based on the pieces of past purchase information belonging to the display target period, and thus the same product is plotted a plurality of times. According to the display result shown in FIG. 5A, the product purchase tendency of the customer can be read. Consider an example by dividing the plot into four parts based on whether the product selection order is early or later and the stay time (selection time) is longer or shorter.

An upper left area 501 in the plot indicates a product which is purchased early in order after the customer visits the store and selected in a short time. This product is determined as a product which the customer has already decided to purchase at the time of the visit. In other words, the customer visits for this product. Such product with high appeal power which is the visit purpose of the customer will be referred to as a product of category I hereinafter.

An upper right area 502 in the plot indicates a product which is purchased in a short time after the customer visits the store but is selected by taking a long time. This indicates that the customer has not decided to purchase a particular product at the time of the visit but their purchase of this kind of product was estimated. Such product which is not a specific regular item for the customer but can be the visit purpose will be referred to as a product of category II hereinafter.

A lower left area 503 in the plot indicates a product which is purchased later in order after the customer visits the store. This product can be said to be a regular item which the customer is not especially eager to purchase at the time of the visit but for which there are a few choices for the customer since the selection time is short. Such product for which the customer has no strong purchase motivation but there are a few choices in product selection will be referred to as a product of category III hereinafter.

A lower right area 504 in the plot indicates a product which is purchased later in order after the customer visits the store and selected by taking a long time. Thus, the product can be said to be a product which the customer is not eager to purchase and does not have a high need to purchase. This will be referred to as a product of category IV hereinafter.

By plotting the selection order of each product by the customer and the selection time taken to select the product, it is possible to know the more detailed tendency of purchase intention to the product and the visit purpose.

For example, in the example shown in FIG. 5A, product A is a regular item for this customer, and is estimated to be a product of high purchase intention since the customer selects early in time after visiting the store. On the other hand, products B and B' are selected later after a visit time elapses. These products are products for which the customer has low purchase intention but has a high need to purchase. Since the selection times are long and products B and B' are mixed, the customer has no preference for the product and selects the product in accordance with the situation (mood or the like) every time.

FIG. 5A shows the tendency of purchase intention for each customer. However, classification can be performed in accordance with the person attributes of each customer, for example, the attributes of each customer such as the age group and sex. According to this classification, it is possible to observe the tendency of purchase intention of a given clientele. FIG. 5B shows an example of the screen on which the time taken by each customer having specific attributes to purchase a specific product is displayed in association with the selection order of the product.

If a product name (or product identification information), a display target period, and customer attributes to be displayed are designated as display conditions, among the pieces of purchase information of customers who have actually purchased the product of the designated product name, purchase information which belongs to the display target period and satisfies the designated customer attributes is acquired from the purchase information database 320. For this product, the product purchase order and the selection time are individually specified, thereby generating display information.

In the display form shown in FIG. 5B, the purchase tendency of the customers having the predetermined attributes can be observed for each product. Information for specifying the product is displayed in the left portion of the screen, and includes, for example, the product name or product identification information, and the information of the store shelf 21 on which the product is displayed. Furthermore, the display target period is displayed, and display is performed based on the purchase results during this period.

In addition, information indicating the attributes of the customer to be displayed is displayed. In FIG. 5B, males in their teens, males in their twenties, and males in their thirties are displayed. The examples of the attributes shown in FIG. 5B are merely examples, and another age group or females can be included in accordance with the designated display conditions. Males and females can be targeted. Only ages can be included regardless of the sex. Furthermore, the age group can be subdivided. For example, if the twenties is further selected after the attributes for every 10 years are displayed, the age group may be subdivided in stages for every five years and every one year and then displayed.

Display can be performed based on attributes other than the age and sex. For example, display may be performed based on an occupation, a residential area, or the like.

In the right portion of the screen, the scatter diagram showing, for each customer attribute, the order at which each customer selects the product to purchase and the time taken to select the product (the time during which the customer stays in front of the store shelf 21) is displayed. The ordinate in the scatter diagram corresponds to the time series (early and later in stay time in the store) from when the customer who purchases the product enters the store until he/she performs payment at the register and leaves the store, and indicates the selection order (early or later in product selection order or product purchase order) of the product on the store shelf 21. Similarly to FIG. 5A, since this time is different for each customer, it is normalized based on the respective stay time from entry to leaving. The abscissa represents the time (long or short in product selection time) elapsed for selection of the product, and the time (long or short in stay time) during which each customer stays in front of the store shelf 21.

In FIG. 5B as well, the category classification in FIG. 5A is effective. The product shown in FIG. 5B can be regarded as a product of category I described above, that is, a product which is purchased by many customers relatively early in time after the entry almost without selection. In other words, it is apparent that with respect to at least this attribute (male), most people visit the store for this product, and this tendency is particularly conspicuous among customers in their teens to thirties. It is thus apparent that this product is preferable as a target product for customers in their teens to thirties. Since many customers visit the store for this product, the product is preferably installed as a product with very high appeal power at a conspicuous place by enlarging the selling space. In this way, it is possible to determine a category to which each product belongs. This can be referred to for arrival and rearrangement of products.

Furthermore, an arbitrary combination of the display conditions for the product, display target period, and attributes can be designated, and only a product having a rate at which it belongs to category I higher than a rate at which a product belongs to each of other categories by a given value can be displayed. For example, in a period of the last one week, a product having a high rate at which it belongs to category I for males in their twenties can be displayed. Based on this display result, a product having high appeal power to males in their twenties can be readily determined. In the period of the last one week, among customers who have purchased product A, a customer attribute belonging to category I can be displayed. Based on this display result, a specific attribute of a customer to which product A has appeal power can be readily determined.

In the above example, display information including a scatter diagram for a specific customer or a specific product is generated. However, display information about the store shelf 21 on which a product is displayed can be generated.

FIG. 6A shows an example of a screen on which, for the specific store shelf 21, the time taken to select a product arranged on the store shelf 21 is displayed in association with the order at which each customer visits the store shelf 21. Note that FIG. 6A displays the information by including a case in which a customer stops at the store shelf 21 but does not select any product.

If information (the ID or number of the store shelf) for specifying the store shelf 21 and a display target period are designated as display conditions, among pieces of purchase information of customers who have actually stopped at the designated store shelf 21, purchase information belonging to the display target period is acquired from the purchase information database 320. Then, the order at which the customer stops the store shelf 21 and the stop time during the display target period and, if the customer purchases one of products displayed on the store shelf 21, the product is individually specified, thereby generating display information.

In the display form shown in FIG. 6A, it is possible to observe, for each store shelf 21, the tendency such as the order at which each customer who visits the store 20 stops at (passes by or visits) the store shelf 21, whether the customer actually selects a product, and the stay time at the store shelf 21. In the left portion of the screen, information for specifying the store shelf 21 is displayed, and includes, for example, the identification information of the store shelf 21, and information (product name or product identification information) of an actually purchased product among the products on the store shelf 21. Information indicating "no purchased" is also included to represent the stay time when no product is selected from the store shelf 21. Furthermore, the display target period is shown, and display is performed based on the purchase results during this period. In accordance with the display conditions, the store shelf 21 may be switched, or only a specific product among the products displayed on the store shelf 21 may be selected and displayed. Alternatively, only "no purchased" can be selected.

In the right portion of the screen, a scatter diagram showing, for each store shelf, the order at which each customer stops at (passes by or visits) the store shelf 21 and the stay time (the time taken to select a product on the store shelf) at the store shelf 21 is displayed. The ordinate in the scatter diagram corresponds to the time series (early and later in stay time in the store) from when the customer who purchases the product enters the store until he/she performs payment at the register and leaves the store, and indicates the order (early or later in an order of passing by the shelf 21) at which the customer passes by each store shelf 21 or the selection order (early or later in product selection order) of the product on the store shelf 21. Similarly to FIG. 5A, since this time is different for each customer, it is normalized based on the respective stay time from entry to leaving. The abscissa represents the time (long or short in stay time) during which each customer stays in front of the store shelf 21 or the time (long or short in product selection time) elapsed for selection of the product on the store shelf 21.

Referring to FIG. 6A, products displayed on store shelf A-1 are exemplified. According to a display result shown in FIG. 6A, as an overall tendency, many of the products displayed on the store shelf A-1 are close to category I or II but not all the products have the same tendency. In category I, especially product A has a strong tendency. Product A' has a not so strong tendency. Therefore, product A indicates that many customers visit the store for this product, and it is recommended to change the position of product A to a conspicuous place at the time of product change. Since customers often visit store shelf A-1 relatively early, it is desired to arrange store shelf A-1 at a position that is easy to access in the store. In this way, it is possible to obtain findings about product arrangement based on the product purchase tendency.

In the display form shown in FIG. 6A, customers who only stop at the store shelf 21 and customers who actually purchase products can be displayed simultaneously. In this display form, if customers who only stop at the store shelf 21 are more than those who purchase products, it is possible to obtain the suggestion of reconsidering the contents of products to be displayed on the store shelf 21.

This embodiment exemplifies, as the application target of the present invention, the store 20 that sells products. Thus, it is possible to observe the tendency of displayed products shown in FIG. 6A for each store shelf 21 as a product installation place in the store 20. To the contrary, if an exhibition site where no products are sold or an exhibition booth in the exhibition site is set as the application target of the present invention, products cannot be purchased, and thus it is impossible to indicate the tendency for each displayed product. However, the present invention can be useful as a solution of, if a person stops at a specific location in the booth, displaying the stop order and the stay time.

According to the screen display shown in FIG. 6A described above, it is possible to determine the category attribute for each product with respect to the given store shelf 21. However, it is also possible to determine the category attribute not for each product but for each store shelf. In the example shown in FIG. 6A, since store shelf A-1 includes many products belonging to category I, such store shelf 21 can be determined as category I. As for each of the remaining store shelves 21, a category to which a largest number of products belong among products on the store shelf 21 can be set as the attribute of the store shelf 21.

FIG. 6B shows an example of screen display in which a category attribute is displayed at the position of each store shelf 21 by determining a category attribute for each of all the store shelves 21, as described above. In FIG. 6B, all the shelves in the store are classified into categories I to IV and displayed. With reference to the display result, it is possible to obtain the suggestion for forming the traffic line of customers by distributing the shelves of category I in the store to be conspicuous since the shelves of category I include many products for which customers visit the store. Since, as for each of the shelves of category II, customers visit early after visiting the store but tend to stay at the position, it is possible to obtain the suggestion that it is necessary to keep a large space in front of the shelf. Since the shelves of category III include daily necessities, and the stay time of a person at each of the shelves is short, the degree of freedom of the installation place of the shelf is high. On the other hand, as for the shelves of category IV, it is difficult to say that customers visit the store for products displayed on each of the shelves. Since, however, a person tends to stay at the shelf, the installation place needs to be taken into consideration. If sales are low, categories III and IV can be candidates for which the product arrangement is reconsidered.

As described above, in this embodiment, with respect to a history of purchasing the same product, it is possible to graphically show the correlation between the purchase order of the product and the time taken to select (decide to purchase) the product. This can graphically show the location of the product in the store 20.

Furthermore, since it is possible to obtain the correlation with the sales, and take statistics of unpurchased products, a closer advertisement selling strategy can be adopted. For example, the advertisement display device 600 is arranged near a product of category I which can motivate a person to visit the store 20, and the advertisement display control unit 207 displays, on the advertisement display device 600, an advertisement of a product of category III which is highly likely purchased when a customer visits the store 20. This can stimulate purchase intention of a customer who visits the store 20 to purchase a product of category I by reminding him/her of the existence of a product of category III.

Alternatively, since the stay time at the store shelf 21 of a product of category I is short, the advertisement display device 600 may be arranged near the store shelf 21 of category II at which a customer stops early and stays for a long time, thereby providing an advertisement of a product of category III. It is possible to perform, using the data of the shelves and the stay times, a customer traffic line/stay simulation when changing the shelves of products in the store, and it is possible to acquire data of a more optimized structure in the store. The embodiment is merely an example, and data for obtaining correlation with the display method and the use method can take various forms.

According to the above embodiment of the present invention, it is possible to provide not only information indicating the order of a product selected by a customer but also information indicating the time taken to select the product. With these pieces of information, it is possible to know the motivation of the customer to select the purchased product. For example, a product which is immediately selected in a short selection time before other purchased products and is repeatedly purchased in the same pattern can be said to be a product for which the customer visits the store. A product which is selected in a short selection time can be estimated to be a necessity for the customer even if the selection order is later, and a kind of product which is purchased when he/she has a chance. On the other hand, a product for which a long time is taken to select, whose order is later, and whose purchase frequency is not high can be said to be a product which is purchased rarely by the customer, and a product which is difficult to be the visit purpose of the user. It is possible to observe the common tendency to a given attribute by analyzing the tendency not only for each customer but also for each specific attribute with respect to a plurality of customers.

The stay time at the store shelf 21 can be considered as the selection time of a product if the product is purchased. On the other hand, if the product is not purchased, it can be estimated that the stay time is long but the product is unpurchased. By this it is possible to grasp a product or product line which is unpurchased.

As described above, according to this embodiment, it is possible to grasp the motivation to purchase a product in the store 20 or a specific characteristic of a product for a specific customer. As for a product whose sales are low, it is possible to know whether the product interests people, which is market information at the time of product change or layout change in the store.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-242877 filed in Dec. 19, 2017 which is hereby incorporated by reference herein in its entirety.

What is claimed is:

1. An information processing apparatus capable of communicating with a plurality of network cameras and database, wherein the plurality of network cameras are arranged in a store and the database stores arrangement information of the plurality of network cameras in the store, the information processing apparatus comprising:

one or more processors; and at least one or more memories storing executable instructions which, when executed by the one or more processors, cause the information processing apparatus to perform operations including:

acquiring, from the plurality of network cameras, a plurality of video images including a customer who visits the store;

acquiring first information including positions and directions of the plurality of network cameras from the database and second information including a position and a size of the customer in the plurality of video images;

generating traffic line information of the customer in the store by converting positions of the customer in the plurality of video images to positions of the customer in the store, based on the first information and the second information;

acquiring purchased product information associated with a product purchased by the customer in the store from a POS register terminal;

specifying for the customer, a time taken to select a purchased product and a selection order of the purchased product, by associating the traffic line information and the purchased product information with the customer; and generating display information for displaying information in association with the time taken to select the purchased product and the selection order of the purchased product, wherein the traffic line information includes information of a stay time of the customer at each of product installation places in the store and an order at which the customer passes by the product installation places in the store, the time taken to select the purchased product is specified based on the stay time of the customer at each of product installation places, and the selection order of the purchased product is specified based on the order at which the customer passes by the product installation place, generating the display information includes classifying each of the product installation places into one of a plurality of categories by analyzing a category of a product of each product installation place and determining a category, to which a largest number of products of each product installation place belong, to be assigned to the corresponding product installation place, based on the time taken to select the purchased product at each of the product installation places and the selection order of the purchase product at each of the product installation places, and the display information includes a position and the category of each of the product installation places.

2. The information processing apparatus according to claim 1, wherein the purchased product information is associated with attributes of the customer determined based on a video image of the customer captured by a network camera arranged in the store, and the attributes include at least a sex and an age group.

3. The information processing apparatus according to claim 2, wherein the display information is generated for displaying information in relation to one of a customer and a product, and the display information is generated, based on a plurality of pieces of the purchased product information generated for a customer who has purchased a specific product, as information for displaying, with respect to the specific product, the time taken to select the purchased product and the selection order of the purchased product.

4. The information processing apparatus according to claim 3, wherein the display information is generated based on the plurality of pieces of the purchased product information generated for a customer having a predetermined attribute among customers who have purchased the specific product.

5. The information processing apparatus according to claim 1, wherein in a case where the purchased product information includes identification information for identifying the customer who has purchased the product, the purchase is associated with attributes of the customer specified based on the identification information, and the attributes include at least the identification information, a sex, and an age of the customer.

6. The information processing apparatus according to claim 5, wherein the display information is generated for displaying information in relation to one of a customer and a product, and the display information is generated, based on a plurality of pieces of the purchased product information generated for a specific customer, as information for displaying, with respect to a product purchased in the past by the specific customer, the time taken to select the purchased product and the selection order of the purchased product.

7. The information processing apparatus according to claim 1, wherein the display information is generated for displaying information in relation to one of a customer and a product, and the display information is generated, based on the plurality of pieces of the purchased product information generated for a customer who has visited a specific product installation place, as information for displaying, with respect to the specific product installation place, a time taken to select a product arranged in the product installation place and a visit order of the product installation place.

8. The information processing apparatus according to claim 7, wherein the display information is generated as information for displaying, together with a time taken to select a product arranged in the product installation place, a stay time of a customer at the product installation place when the customer who visits the specific product installation place does not purchase a product arranged on the specific product installation place.

9. The information processing apparatus according to claim 1, wherein the executable instructions, when executed by the one or more processors, cause the information processing apparatus to perform further operations including:

acquiring conditions for generating the display information, wherein the display information is generated for displaying information in relation to one of a customer and a product, and the display information is generated based on designation associated with at least one of a product, a customer, and purchase time of the product included in the conditions.

10. The information processing apparatus according to claim 1, wherein the executable instructions, when executed by the one or more processors, cause the information processing apparatus to perform further operations including:

controlling advertisement display on an advertisement display device installed in the store, wherein the advertisement display device is arranged near a product installation place assigned with a category, whose order is early, among the plurality of categories, and the advertisement display device is controlled to display an advertisement of a product in a product installation place assigned with the category whose order is later.

11. The information processing apparatus according to claim 1, wherein positions of the product installation places indicate positions of shelves located in the store on which products are installed.

12. The information processing apparatus according to claim 1, wherein the display information is generated for displaying information in relation to one of a customer and a product, and the display information includes a scatter diagram displaying a plurality of purchased products corresponding to attributes of the customer, based on an axis associated with the time taken to select the purchased product and an axis associated with the selection order of the product.

13. A system comprising an information processing apparatus, a network camera and an information display device:

wherein the information processing apparatus capable of communicating with a plurality of network cameras and database, the plurality of network cameras are arranged in a store, the database stores arrangement information of the plurality of network cameras in the store, the information processing apparatus comprising one or more processors, and at least one or more memories storing executable instructions which, when executed by the one or more processors, cause the information processing apparatus to perform operations including:

acquiring, from the plurality of network cameras, a plurality of video images including a customer who visits the store;

acquiring first information including positions and directions of the plurality of network cameras from the database and second information including a position and a size of the customer in the plurality of video images;

generating traffic line information of the customer in the store by converting positions of the customer in the plurality of video images to a position of the customer in the store, based on the first information and the second information;

acquiring purchased product information associated with a product purchased by the customer in the store from a POS register terminal;

specifying, for the customer, a time taken to select a purchased product and a selection order of the purchased product, by associating the traffic line information and the purchased product information with the customer; and generating display information for displaying information in association with the time taken to select the purchased product and the selection order of the purchased product, wherein the traffic line information includes information of a stay time of the customer at each of product installation places in the store and an order at which the customer passes by the product installation place in the store, the time taken to select the purchased product is specified based on the stay time of the customer at each of product installation places, and the selection order of the purchased product is specified based on the order at which the customer passes by the product installation place, generating the display information includes classifying each of the product installation places into one of a plurality of categories by analyzing a category of a product of each product installation place and determining a category, to which a largest number of products of each product installation place belong, to be assigned to the corresponding product installation place, based on the time taken to select the purchased product at each of the product installation places and the selection order of the purchase product at each of the product installation places, the display information includes a position and the category of each of the product installation places, wherein the network camera is configured to generate a video image by capturing an interior of the store, and provide, to the information processing apparatus, information generated by tracking a movement of a customer in the store, included in the video image, who visits the store, and wherein the information display device is configured to display the display information generated by the information processing apparatus.

14. A control method for an information processing apparatus capable of communicating with a plurality of network cameras and database, the plurality of network cameras are arranged in a store, the database stores arrangement information of the plurality of network cameras in the store, the method comprising:

acquiring, from the plurality of network cameras, a plurality of video images including a customer who visits the store;

acquiring first information including positions and directions of the plurality of network cameras from the database and second information including a position and a size of the customer in the plurality of video images;

generating traffic line information of the customer in the store by converting positions of the customer in the plurality of video images to a position of the customer in the store, based on the first information and the second information;

acquiring purchased product information associated with a product purchased by the customer in the store from a POS register terminal;

specifying, for the customer, a time taken to select a purchased product and a selection order of the purchased product, by associating the traffic line information and the purchased product information with the customer; and generating display information for displaying information in association with the time taken to select the purchased product and the selection order of the purchased product, wherein the traffic line information includes information of a stay time of the customer at each of product installation places in the store and an order at which the customer passes by the product installation place in the store, the time taken to select the purchased product is specified based on the stay time of the customer at each of product installation places, and the selection order of the purchased product is specified based on the order at which the customer passes by the product installation place, generating the display information includes classifying each of the product installation places into one of a plurality of categories by analyzing a category of a product of each product installation place and determining a category, to which a largest number of products of each product installation place belong, to be assigned to the corresponding product installation place, based on the time taken to select the purchased product at each of the product installation places and the selection order of the purchase product at each of the product installation places, and the display information includes a position and the category of each of the product installation places.

15. A non-transitory computer-readable storage medium storing a program that, when executed by a processor of an information processing apparatus capable of communicating with a plurality of network cameras and database, wherein the plurality of network cameras are arranged in a store and the database stores arrangement information of the plurality of network cameras in the store, causes the processor to perform:

acquiring, from the plurality of network cameras, a plurality of video images including a customer who visits the store;

acquiring first information including positions and directions of the plurality of network cameras from the database and second information including a position and a size of the customer in the plurality of video images;

generating traffic line information of the customer in the store by converting positions of the customer in the plurality of video images to a position of the customer in the store, based on the first information and the second information;

acquiring purchased product information associated with a product purchased by the customer in the store from a POS register terminal;

specifying, for the customer, a time taken to select a purchased product and a selection order of the purchased product, by associating the traffic line information and the purchased product information with the customer; and generating display information for displaying information in association with the time taken to select the purchased product and the selection order of the purchased product, wherein the traffic line information includes information of a stay time of the customer at each of product installation places in the store and an order at which the customer passes by the product installation place in the store, the time taken to select the purchased product is specified based on the stay time of the customer at each of product installation places, and the selection order of the purchased product is specified based on the order at which the customer passes by the product installation place, generating the display information includes classifying each of the product installation places into one of a plurality of categories by analyzing a category of a product of each product installation place and determining a category, to which a largest number of products of each product installation place belong, to be assigned to the corresponding product installation place, based on the time taken to select the purchased product at each of the product installation places and the selection order of the purchase product at each of the product installation places, and the display information includes a position and the category of each of the product installation places.

* * * * *